United States Patent

[11] 3,559,704

[72] Inventor William H. Thompson
 4149 Eliot St., Denver, Colo. 80211
[21] Appl. No. 820,939
[22] Filed May 1, 1969
[45] Patented Feb. 2, 1971

[54] JIG FOR GUIDING A ROUTER
 9 Claims, 13 Drawing Figs.
[52] U.S. Cl. .................................... 144/144.5,
 33/197; 144/27
[51] Int. Cl. .......................................... B27f 5/12
[50] Field of Search ............................ 144/144.5,
 27; 33/197

[56] References Cited
UNITED STATES PATENTS
2,629,937 3/1953 Tubbs ........................... 144/27X
3,082,800 3/1963 Soss .............................. 144/27
3,150,452 9/1964 Meuwissen ................... 33/197
3,211,026 10/1965 Calahan ....................... 144/27X Primary Examiner—Donald R. Schran
Attorney—Van Valkenburgh and Lowe ABSTRACT: The jig is attached to a door jamb by pins mounted on longitudinal adjustable end brackets which are adjustable inwardly on the underside of and into an aperture in a plate which is engaged by the base of the router. The end brackets are also provided with spacers which extend to the surface of the door jamb. The side of the plate aperture is closed by a side plate which also extends to the door jamb. A corner guide having a notch, which fits against a corner of the end bracket, together with the inner ends of the end brackets, guides the router in forming a shallow groove for a strike plate, after a well for the catch box has been formed by the router, adjusted to cut to a greater depth. A removable template having an aperture for guiding the router in cutting the well rests against the inwardly extending ends of the end brackets and the corner guides, and is provided with a strip which engages the underside of the main plate. A pair of abutments, adjustable on the underside of the main plate, determine the spacing of the jig from the side of the door jamb. The end brackets and corner guides may also be adjusted to guide the router in cutting a different size or shape of groove, while an alternative template is used in guiding the router to cut a different size of well.

INVENTOR.
William H. Thompson
BY
Van Valkenburgh & Lowe
ATTORNEYS

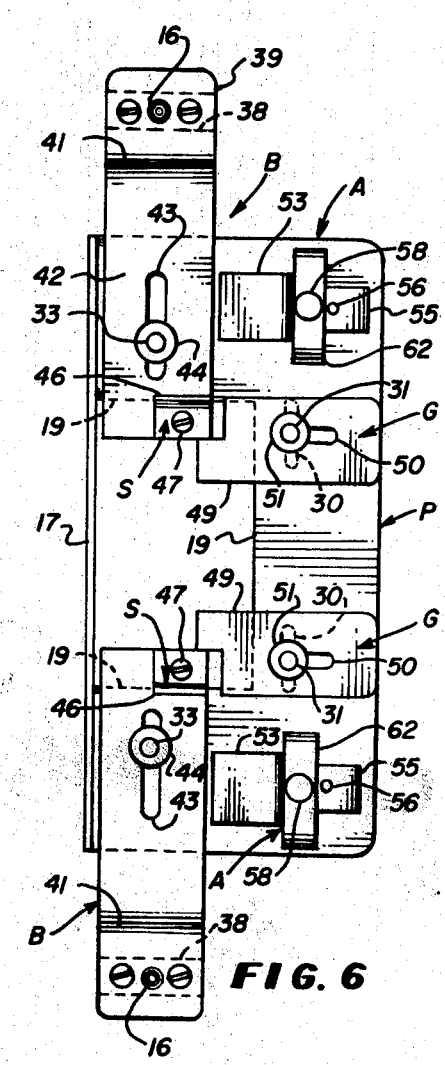
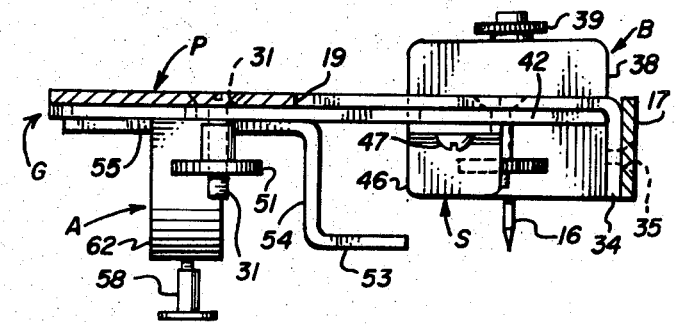
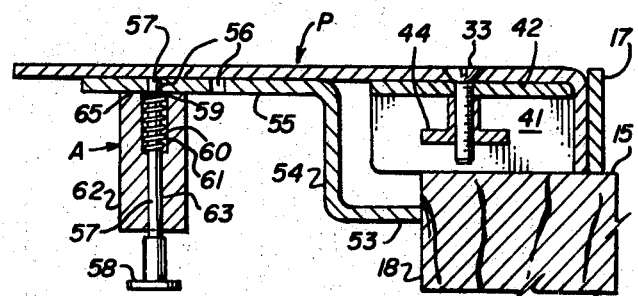
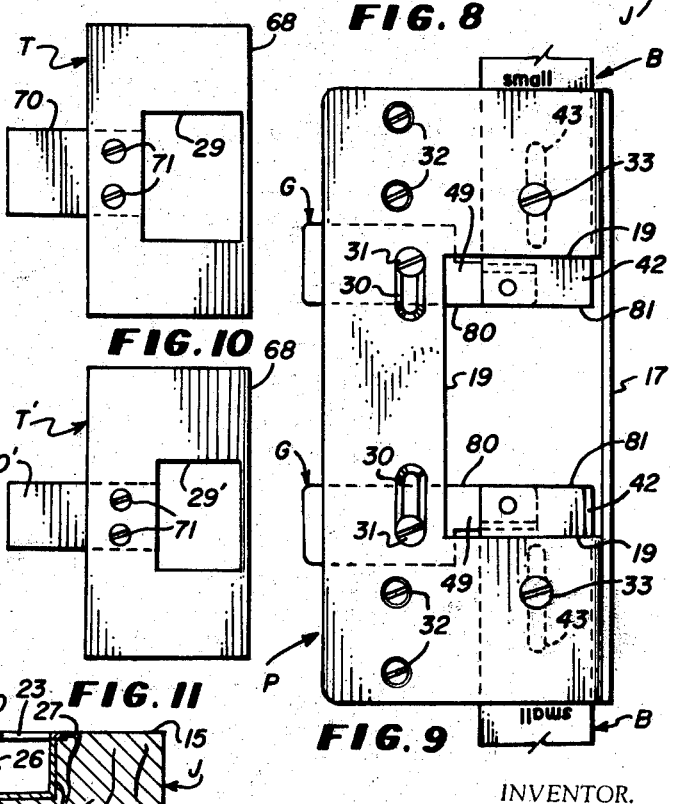
INVENTOR.
William H. Thompson
BY
Van Valkenburgh & Lowe
ATTORNEYS

JIG FOR GUIDING A ROUTER

This invention relates to jigs for guiding a router or the like in producing grooves or recesses of different depths, particularly jigs for guiding a router or similar device in producing grooves and recesses for strike plates and the like, which require a shallow groove for the strike plate and a deeper recess or well, as in a door jamb or the like, for the catch box.

For installing strike plates and catch boxes in door jambs, it has previously been customary to bore or drill to a depth approximating the depth of a well or recess adapted to receive the catch box, then to chisel out by hand the remainder of the well and chisel by hand a groove for receiving the strike plate. Motor driven routers have also been utilized for the same purpose, although these initially required considerable skill and accurate measurement of the area of the wood to be removed. Also, different types of jigs have been devised for guiding such routers, but these have required separate jigs for the well and the strike plate groove, necessitating a pair of jigs for each size of strike plate to be installed.

Among the objects of this invention are to provide a novel jig for guiding cutting tools, particularly routers, in cutting grooves or recesses of different depths; to provide such a jig which is particularly adapted to guide a router in forming the grooves and recesses for a strike plate in a door jamb; to provide such a jig which need be installed only once for the entire operation; to provide such a jig which is readily adjustable to accommodate different sizes of grooves for strike plates and wells for the accompanying catch boxes; to provide such a jig which does not require an expert workman for use; to provide such a jig which may be installed quickly and easily; to provide such a jig which may be placed on and removed without difficulty from a door jamb which is already installed; and to provide such a jig which will be efficient and effective in use.

Additional objects and the novel features of this invention will become apparent from the description which follows, taken in conjunction with the accompanying drawings, in which:

FIG. 6 is a rear plan view of the jig of FIG. 1;

FIG. 7 is a transverse section, on an enlarged scale, taken along line 7-7 of FIG. 1;

FIG. 8 is an offset transverse section, on an enlarged scale, taken along line 8-8 of FIG. 1 and showing, in section, a portion of the door jamb, with an abutment adjusted to a different position;

FIG. 9 is a fragmentary top plan view corresponding to the central portion of FIG. 1, but with the parts of the jig adjusted for routing operations for a smaller size of strike plate;

FIG. 10 is a top plan view of the template of FIG. 5, utilized in conjunction with the jig, when the parts thereof are adjusted to the position shown in FIG. 1, for guiding the router in forming the recess for a box of a larger strike plate;

FIG. 11 is a top plan view of a template for utilization with the jig when the parts are adjusted to the positions shown in FIG. 9, for guiding the router in forming the recess to accommodate the box of a smaller type of strike plate;

FIG. 12 is a front elevation, on a reduced scale, of a larger size of strike plate installed on a door jamb; and FIG. 13 is a fragmentary section, taken along line 13-13 of FIG. 12.

Figure 2:
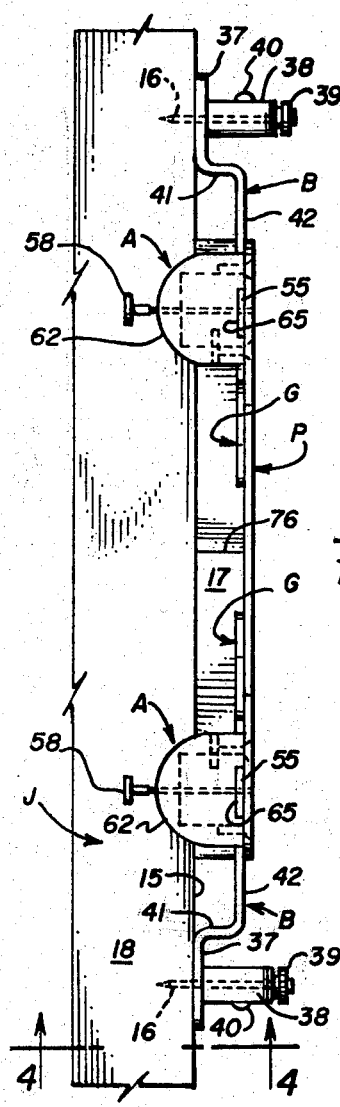
FIG. 2 is a side elevation taken from one side of the jig of FIG. 1, when installed on a door jamb, the latter being shown fragmentarily.

A strike plate jig constructed in accordance with this invention, as shown in FIGS. 1—4 and 6, comprises essentially a plate P on which an end bracket B is adjustably mounted at each end, for attachment to the edge 15 of a door jamb J or the like, as by pins 16 which are driven into the door jamb. A side plate 17 depends from one side of plate P and rests against the edge 15 of the door jamb, as in FIG. 4. A pair of abutments A, adjustably mounted on the underside of the plate P, engage the side 18 of the door jamb toward which the door closes, while a spacer S, which depends from the inner end of each bracket B, supports plate P at each end of a central cutout or aperture 19 therein. The open side of cutout 19 is closed by sideplate 17, while the inner edge of each end bracket B, as well as the inner end of each of a pair of notched, adjustable corner guides G, extend into the space below aperture 19, for a purpose described below. In essence, the sideplate 17, together with the inner ends of the end brackets B and the corners of the corner guides G, exposed within the cutout 19, guide the router in forming the groove or recess for the strike plate. The end brackets and corner guides are adjustable between the positions of FIGS. 1 and 9, to accommodate different sizes of such grooves. A template T of FIG. 10 is adapted to fit into the aperture 19, as in FIG. 5, to guide a second router in cutting the recess for a catch box, while a template T' of FIG. 11 similarly fits into aperture 19 with the parts adjusted to the positions of FIG. 9, for a similar purpose.

Figure 1:
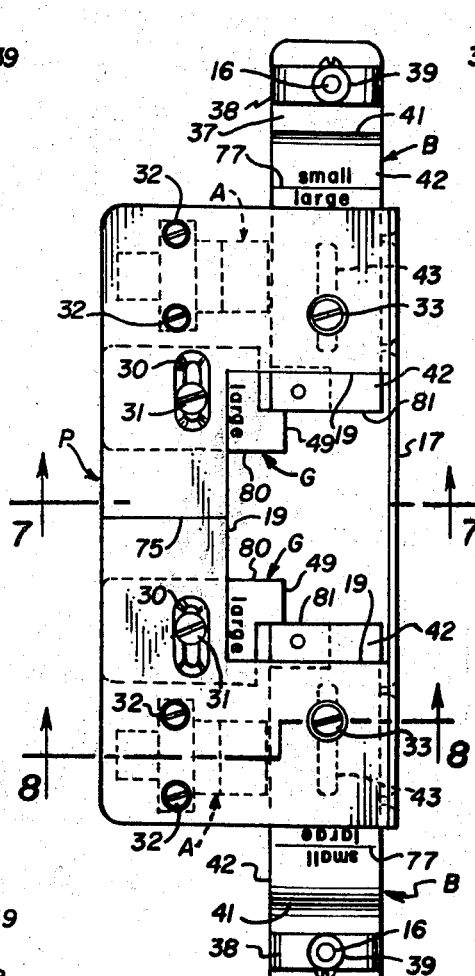
FIG. 1 is a front plan view of a strike plate jig constructed in accordance with this invention, but without a special template which is used therewith.

A more detailed description of the above parts will be better understood by reference to a typical strike plate installation, shown in FIGS. 12 and 13, which corresponds to the strike plate installed in the groove and recess produced when the end brackets B and corner guides G are adjusted to the position of FIG. 1 and using the template T of FIG. 10. As in FIG. 12, a strike plate 20 is essentially rectangular, provided with a laterally extending flange 21 having a curved lip 22 which extends past the side 18 of the door jamb, so as to be engaged initially by the door catch, as the door closes. As the door moves to closed position, the catch is retracted as it rides along lip 22 and flange 21, then is extended as it moves through a rectangular aperture 23. The strike plate is also provided with holes 24 for attachment to the door jamb, conventionally by countersunk screws. In some installations, a recess 25 beneath the strike plate is merely hollowed out, but in more modern installations, a metal box 26 is provided into which the latch extends, when the door is closed. The box 26 may be merely a separate part with flanges underlying the ends of the strike plate and held in recess 25 by the latch plate, or may be integral with the latch plate, as by being welded to the underside thereof. In any event, both recess 25 for the box and a groove 27 for the latch plate is to be formed in the edge 15 of the door jamb. The groove for the latch plate is also provided with a lateral extension 28 to accommodate latch plate flange 21. Groove 27 is relatively shallow, as on the order of one-eighth inch deep, while recess 25 is deeper, as on the order of three-quarter inch to seven-eighths inch. When a modified latch plate, whose lip 22 extends the full length of the latch plate, is used, groove 27 may be extended to a position corresponding to ends 27', indicated in dotted lines in FIG. 12.

A circular router cannot, of course, cut a square corner, so that both the recess 25 and groove 27 are produced with concave corners. These corners are, however, easily squared out by use of a corner chisel. Such routers are conventionally driven by an electric motor and are adapted to be hand held, having a base which rests on plate P, the router being readily adjusted to produce the depth of cut desired, and a guide collar which engages the inside of sideplate 17 and the exposed inner edges of brackets B and corner guides G, in forming the groove 27, or the edges of an aperture 29 in template T of FIGS. 5 and 10, or aperture 29' in template T' of FIG. 11, in forming the recess or well 25. Thus, the recess 25 and groove 27 produced by use of the jig with the parts adjusted to the position of FIG. 1 and the template T of FIG. 10, correspond to the recess and groove shown. For some installations, as indicated above, the lip 22 extends the full length of the strike plate 20, so that the groove 27 is merely rectangular in its outer dimension. It will be noted that, as in FIG. 13, the groove 27 forms a shoulder at the rear side of the recess 25, but this shoulder is readily produced in the manner hereinafter described. It will also be noted that in producing the groove and the recess, it is immaterial whether the groove or the recess is produced first, although preferably the recess is first produced by installing the template T or T' in the jig, then removing the template and forming groove 27, after adjustment of the router, to produce a shallow cut.

Figure 3:
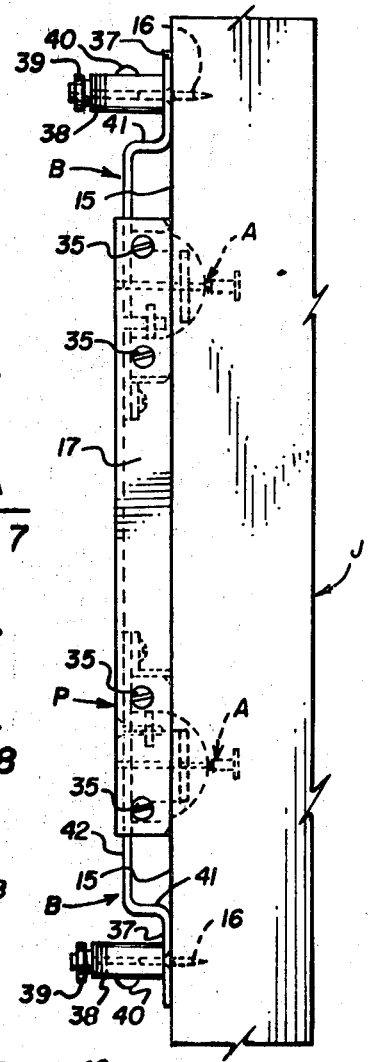
FIG. 3 is a side elevation similar to FIG. 2, but taken from the opposite side.
Figure 4:
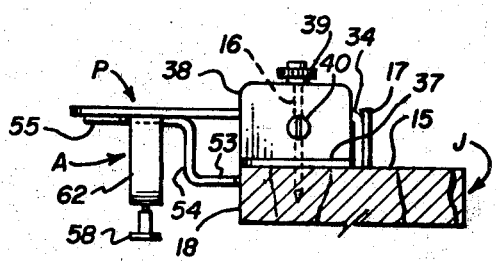
FIG. 4 is an end view of the jig, taken from the position of line 4-4 of FIG. 2, and showing also a portion of the door jamb, in section.

Referring now to FIG. 1—3, the plate P, in addition to the cutout or aperture 19, is provided with a pair of longitudinal slots 30 for receiving adjusting screws 31 for the corner guides G and providing longitudinal adjustment of the corner guides G. The corner guides G are also laterally adjustable, in a manner hereinafter described. Plate P is also provided with holes for screws 32, by which the abutments A are attached, and holes for adjusting screws 33, for longitudinal adjustment of the respective end brackets B. In addition, plate P is provided with a depending flange 34 at each end of aperture 19, by which sideplate 17 is removably attached to the jig, as by screws 35. Since sideplate 17 is the only part adjacent aperture 19 which extends to the surface of the door jamb, it is more likely to be struck accidentally by the router and thus may need to be replaced periodically. Flanges 34 also maintain end brackets B in alignment.

Each end bracket B includes a base 37 which abuts against the edge of the door jamb, as in FIGS. 2 and 3, and to which is attached an upstanding block 38 in which pin 16 is movable, each pin 16 being provided with a boss 39 spaced a slight distance inwardly from its outer end, which limits the distance which the pin will penetrate into the door jamb. Each block 38 may be provided with a setscrew 40, for locking each pin in an outer position, as when the jig is being centered on a finished surface. An offset 41 connects base 37 with an elongated flange 42 which extends longitudinally beneath plate P and, as in FIG. 6, is provided with a longitudinally extending slot 43, through which the corresponding screw 33 extends, the bracket B being adapted to be clamped in adjusted position to plate P by tightening a knurled nut 44 on the respective screw 33.

Each spacer S is conveniently attached to the underside of an end bracket B, comprising an angle clip whose depending flange 46 extends to the level of the underside of base 37, but is spaced from the inner edge of the end bracket to avoid interference with the router. Thus, the angle clip spacer S is attached to the underside of the bracket by a screw 47, although spacing flange 46 may be formed integrally with or affixed to the underside of the end bracket in any other suitable manner, as by welding.

Each corner guide G, as in FIGS. 6 and 7, is generally rectangular, being provided with an extending lip 49 which is narrower than the remainder of the corner guide and is adapted to engage the guide collar for the router in cutting the corner between groove 27 and its lateral extension 28. Screw 31, which, as indicated above, is adjustable in slot 30 of plate P, also extends through a slot 50, in the corner guide, which is transverse to slot 31, and permits each corner guide to be adjusted laterally of the jig, as well as longitudinally, as between the positions of FIGS. 1 and 9. A knurled nut 51, or other suitable device, may be tightened against the respective corner guide, to hold it in adjusted position.

Each abutment A, as in FIG. 8, includes a Z-shaped bracket having a spacer flange 53, the end of which is adapted to abut against the side 18 of the door jamb J, to place the sideplate 17 opposite thereto, in the proper position for cutting along the far edge of the strike plate groove 27. Flange 53 is connected to a center leg 54 with an adjusting flange 55, which is adjustable along the underside of plate P. For this purpose, the adjusting flange 55 is provided with a pair of holes 56, alternatively engaged by an adjustment pin 57, to provide for narrower or wider strike plate grooves. Pin 57 has a head 58, for retraction purposes, and a fixed collar or washer 59 engaging one end of a coil spring 60 mounted within a socket 61, in a block 62. Pin 57 extends through a hole 63 in block 62, while block 62 is attached to the underside of plate P, as by screws 64 of FIG. 2, and has a slot 65 of FIGS. 2 and 8 in which adjusting flange 55 of the respective spacer S is movable. As in FIG. 6, the spacing flange of each abutment A may be wider than the adjusting flange, to provide additional bearing area between the end of the spacing flange and the side 18 of the door jamb J.

Figure 5:
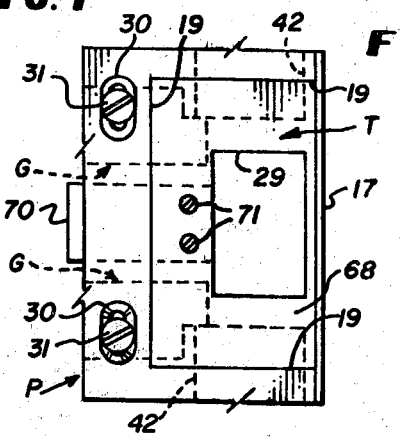
FIG. 5 is a fragmentary top plan view, corresponding to a central portion of FIG. 1, with a template installed therein for guiding the router in cutting the well for the catch box.

Template T, as in FIG. 10, includes a rectangular plate 68 corresponding in size to aperture 19 in plate P and adapted to fit therein, as in FIG. 5. The rectangular aperture or cutout 29 in plate 68 corresponds in width and length to recess or well 25 of FIGS. 12 and 13, with an additional size to compensate for the greater diameter of the guide collar than that of the router. A strip 70 is attached to the underside of plate 68, as by screws 71, so as to extend therefrom and underlie plate P, as in FIG. 5, to hold the template in the jig more securely. When placed in the jig, plate 68 rests on the portions of end brackets B and corner guides G when extended into aperture 19, while strip 70 forms a lip which locks under plate P. As will be evident, strip 70 fits between corner guides G.

Template T' of FIG. 11 is similar to template T, including a plate 68 of the same size as aperture 19 in plate P, but a smaller aperture 29' to guide the router in forming a smaller well for the catch box. Strip 70' of template T', which is attached to plate 68 by screws 71, forms a lip extending from beneath plate 68 and also underlies plate P when placed in aperture 19.

For use of the jig J and templates T and T', the jig is placed on a door jamb, as in FIGS. 2 and 3, and centered with respect to the position of the strike plate and box wherein a groove and well are to be cut. To assist the user in centering the jig on the door jamb, plate P may be provided with a centerline mark 75, as in FIG. 1, and sideplate 17 with a centerline mark 76, as in FIG. 2, on the inside thereof. Thus, the jig may be readily lines up with the centerline mark placed on the door jamb. The abutments A are previously adjusted to the width of the groove 27 of FIG. 13, so that the sideplate 17 will be spaced the required distance from side 18 of the door jamb. The normal setting is that shown in FIG. 7, although for wider grooves, the abutments A may be adjusted to the position of FIG. 8 by pulling out pin 57, moving the abutment outwardly and then releasing in 57 to enter the appropriate hole 56. For adjustment of the end brackets B, the outside of each end bracket may be provided with one or more lines, such as line 77 of FIG. 1, and a corresponding line which, in FIG. 1, is not shown, because it is in alignment with the end of plate P. These two lines have been indicated as "large" and "small," to distinguish between the adjustment of the parts as shown in FIG. 1 and the adjustment of the parts as shown in FIG. 9, although any other suitable indicia may be utilized. It will be noted that, in FIG. 9, the line 77 of FIG. 1 is not seen because it is in alignment with the end of plate P. The corner guides G are also provided with a line (not shown), but to which "large" has been applied, since in the adjustment of FIG. 1, each corner guide is adjusted to a position in which this line is in alignment with the edge of aperture 19. For adjustment of the corner guides to cut groove 27 of FIGS. 12 and 13, the corner guides, as in FIG. 1 are adjusted so that this line is in alignment with the edge of aperture 19, and the lip 49 of the corner guide abuts the inner end 81 of the adjacent end bracket B.

With the parts of the jig so adjusted and the jig aligned centrally with the desired position of the strike plate on the door jamb, the strike plate may merely be held in position on the door jamb, and each of the end bracket pins 16 struck with a hammer, so as to become embedded in the door jamb, as in FIGS. 2 and 3. These pins hold the jig on the door jamb, but the pins are sufficiently small that the hole produced thereby will easily be masked in a conventional manner. The template T may then be placed in the aperture 19, as in FIG. 5, with the template abutting the inner ends of both end brackets B and both corner guides G and with strip 70 engaging the underside of plate P. The router is adjusted to produce the depth of well 25 desired and the base of the router placed on plate P with the guide collar within aperture 29 of template T. The router is then moved around to cut the recess or well 25, with the guide collar for the router moved against each of the edges of aperture 29 in the template and also across the aperture 29. The template T may then be removed from the jig, the router adjusted for a shallower cut, and the router than utilized in cutting groove 27, during which the guide collar of the router engages sideplate 17 and the end of each bracket B and corner guide G. The jig may then be removed and a right angle corner chisel utilized to square out the corners of groove 27 and well 25.

For a smaller size of strike plate and box, the template T' is utilized and the parts of the jig are adjusted to the position shown in FIG. 9, the jig being installed in the same manner as described above. Lip 22 of this smaller size of strike plate extends to a position corresponding to the dotted lines 27' of FIG. 12. Thus, the corner guides G are adjusted until an edge 80 of each corner guide is in alignment with the inner edge 81 of the corresponding end bracket B. The template T' is placed in aperture 19 of plate P and the well corresponding to well 25 of FIG. 13 cut in the manner described above. The template T' is then removed and the router depth adjusted, so that the groove corresponding to groove 27 may be cut by moving the router guide collar against the inner edges of the end brackets B and corner guides G, adjusted as in FIG. 9, as well as the sideplate 17.

From the foregoing, it will be evident that the jig of this invention provides to a remarkable degree the requirements and objects hereinbefore set forth. The jig is readily centered on and attached to a door jamb with accurate positioning, due to the predetermined positions of the abutments and alignment of the centerlines on the jig with the centerline of the position in which the strike plate is to be placed. The grooves and recesses of different depths can be cut without the necessity of repositioning the jig on the door jamb or using two jigs for the purpose, since the templates T and T' are readily placed in and removed from the aperture in the plate P. Also, the templates T and T' rest against the projecting portions of the end brackets and corner guides, which, after removal of the template, are in exact position to guide the router in producing a much shallower groove which extends around the deeper well or recess. The guiding portions of the jig are spaced from the surface in which the cut is made, except for the sideplate 17, which may be replaced, if damaged by being accidentally struck by the router. As will be evident, a large number of strike plates and their boxes may be installed in a series of door jambs in succession, with a minimum of time required for setting up and installing the jig each time.

It will be understood, of course, that the jig of this invention may be utilized in forming deeper wells and shallower grooves for other than strike plates and that sizes and shapes of strike plates and catch boxes different from those described may be formed through appropriate adjustment of the parts of the jig, requiring only an additional template for a different size of catch box well. It will also be understood that other changes and variations may be made in the jig of this invention, without departing from the spirit and scope thereof.

I claim:

1. A jig for guiding a router and the like associated with a guiding and depth control device, in cutting grooves and recesses of different depths and different lateral extent from a surface of an object of a material capable of being cut by said router and the like comprising:
    a plate having an aperture therein, the ends of said aperture being spaced apart a greater distance than the longitudinal extent of said groove;
    a bracket attached to said plate adjacent each end of said aperture and adjustable inwardly toward the center of said aperture to a position for guiding a router, through engagement with said guiding device, corresponding to the end edges of said groove; and
    a template corresponding in size to said aperture and insertable therein for engagement with the extended inner ends of said brackets, said template having an aperture provided with edges for engagement with said guiding device for guiding said router in cutting a recess of greater depth than said groove.

2. A jig as defined in claim 1, wherein each said end bracket is provided with:
    a base adapted to engage said surface and an offset connecting said base with a flange adjustable along the underside of said plate, so as to support said plate in spaced relation to said surface; and
    a pin mounted on each said base in a position to be driven into said object to attach said jig to said object in a desired position on said surface.

3. A jig as defined in claim 2, wherein each said end bracket is provided with spacing means adjacent its inner end extending to and engaging said surface with said jig positioned thereon.

4. A jig as defined in claim 1, including a guide secured to said plate adjacent each end of said aperture and adjustable longitudinally and laterally of said plate and toward and away from the extending inner ends of the corresponding brackets, said inner ends of said brackets having a lesser width than said plate aperture.

5. A jig as defined in claim 4, wherein each said guide is provided with an extending lip adapted to engage a corner of the inner end of the corresponding bracket to guide said router in cutting a groove having a greater longitudinal dimension at a position between said inner ends of said brackets than at a position between said guides.

6. A jig as defined in claim 5, including:
    longitudinal slots in said plate adjacent said aperture and at the positions of said guides;
    a slot in each said guide transverse to said plate slot; and
    means for each guide extending through said plate slot and said guide slot for adjustment of said guide to different positions, both longitudinally and laterally with respect to said plate, and for clamping said guide in an adjusted position.

7. A jig as defined in claim 1, wherein:
    said plate aperture extends to and is open at a side edge of said plate and said plate has a depending flange at each end of said aperture; and
    a side plate is removably attached to said flanges and closes said open side of said aperture.

8. A jig as defined in claim 1, including abutment means attached to said plate adjacent each end thereof and adjustable laterally of said plate, each said abutment means being engageable with a second surface of said object at right angles to said first mentioned surface and at a position spaced from said plate, said abutment means, in a predetermined adjusted position, spacing the opposite edge of said plate aperture a corresponding distance from said second surface of said object.

9. A jig as defined in claim 8, wherein:
    each said abutment means includes a spacing flange whose inner end is engageable with said second surface and a center leg connecting said spacing flange with an adjusting flange slidable along the underside of said plate and provided with spaced holes;
    a block attached to the underside of said plate is provided with a slot for movement of said adjusting flange laterally of said plate;
    a pin extending toward said adjusting flange in said block is engageable with said holes alternatively; and
    resilient means releasably urges said pin into the engaged hole.